United States Patent [19]

Kobayashi

[11] 4,083,392
[45] Apr. 11, 1978

[54] COMBINED BASKET AND BAG CONSTRUCTION

[75] Inventor: Yoshimatsu Kobayashi, Kurobe, Japan

[73] Assignee: Yoshida Kogyo K.K., Tokyo, Japan

[21] Appl. No.: 716,091

[22] Filed: Aug. 20, 1976

[30] Foreign Application Priority Data

Sep. 2, 1975 Japan .................... 50-121615[U]

[51] Int. Cl.² .............................................. B65D 11/14
[52] U.S. Cl. .................................. 150/51; 150/52 K; 224/30 R; 220/404
[58] Field of Search ............... 150/51, 50, 52 K; 220/63 R; 224/31, 32 R, 32 A, 30 R

[56] References Cited

U.S. PATENT DOCUMENTS

| | | | |
|---|---|---|---|
| 2,007,997 | 7/1935 | Beulke et al. | 150/51 |
| 2,536,169 | 1/1951 | Gray | 150/1.6 |
| 3,000,419 | 9/1961 | Morrison | 150/52 K |
| 3,396,885 | 8/1968 | Giondi | 150/51 |

Primary Examiner—William Price
Assistant Examiner—Joseph Man-Fu Moy
Attorney, Agent, or Firm—Dennison, Dennison, Meserole & Pollack

[57] ABSTRACT

A combined basket and bag construction comprises a basket of generally rectangular configuration and a bag detachably fitted internally of the basket. The bag includes a body made of a flexible material and having base and cover portions split along the periphery of the bag body to define a peripheral opening therebetween. A sliding clasp fastener has a pair of interengageable stringer tapes secured respectively to the marginal edges along the length of the peripheral opening. The upper portion of the bag is foldable outwardly upon the basket on and along the peripheral edge of the basket with the sliding clasp fastener being covered and concealed from view by the upper portion.

2 Claims, 4 Drawing Figures

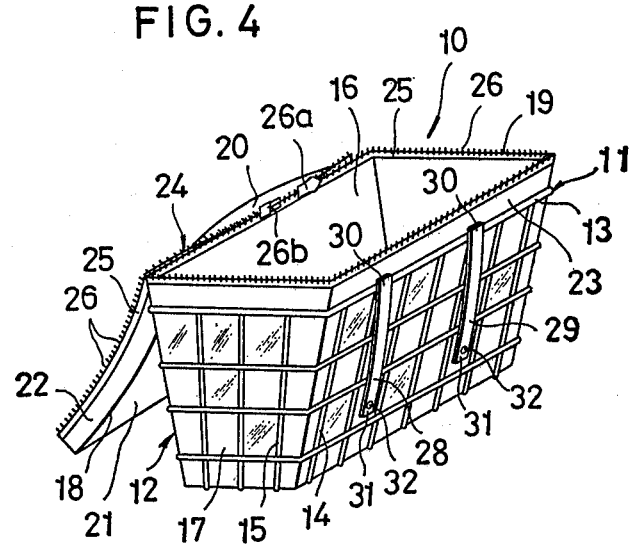

COMBINED BASKET AND BAG CONSTRUCTION

BACKGROUND OF THE INVENTION

1. Field of the Invention

This invention relates to containers and more particularly to a container of a basket type useful for containing a variety of articles and suitable for being mounted on a bicycle or other carriages.

2. Prior Art

There are known various forms of baskets designed for being mounted on bicycles or the like, but most of such conventional baskets are built with widely spaced stakes such that contents of a small size cannot be accommodated without falling out through the basket. To prevent this, more advanced baskets are equipped with a bag or a lining fitted in place internally of the basket. However, such a bag or lining is open-ended or top-less, so that the contents of the basket are apt to be blown off by wind or wetted when it is rainy.

SUMMARY OF THE INVENTION

It is therefore an object of this invention to provide a combined basket and bag construction in which a bag with a readily closable cover is fitted in place internally of a basket to ensure that contents of a small size can be accommodated without falling out of the basket.

According to the invention, there is provided a combined basket and bag construction comprising: a basket of generally rectangular configuration having an open top; a bag including a hollow body made of a flexible material and having base and cover portions split along the periphery of said bag body to define a peripheral opening therebetween, and an elongated connecting portion extending along a minor portion of the periphery of said bag body and connecting said base and cover portions at their limited portions to interrupt said peripheral opening, said bag body being fitted internally of said basket, said connecting portion serving as an axis of fold about which said cover portion can be folded outwardly, the upper portion of said bag projecting outwardly of said basket, and said peripheral opening being located in said upper portion; a sliding clasp fastener having a pair of stringer tapes carrying along their inner longitudinal edges rows of interengageable fastener elements, and a slider movable along said fastener elements to close and open said sliding clasp fastener, said stringer tapes being secured to the marginal edges along the complete length of said peripheral opening; means removably attaching said bag to said basket; and said upper portion being foldable outwardly upon said basket along and over the peripheral edge thereof with said sliding clasp fastener being covered and concealed from view by said upper portion.

Many other advantages and features of the present invention will become manifest to those versed in the art upon making reference to the detailed description and the accompanying sheet of drawings in which a preferred structural embodiment incorporating the principles of the present invention is shown by way of example.

BRIEF DESCRIPTION OF THE DRAWINGS

FIG. 3 is a view similar to FIG. 2 but showing the upper portion of the bag in its folded condition and FIG. 4 is a view similar to FIG. 1 showing an alternate embodiment.

DETAILED DESCRIPTION OF THE PREFERRED EMBODIMENT

Figure 1:
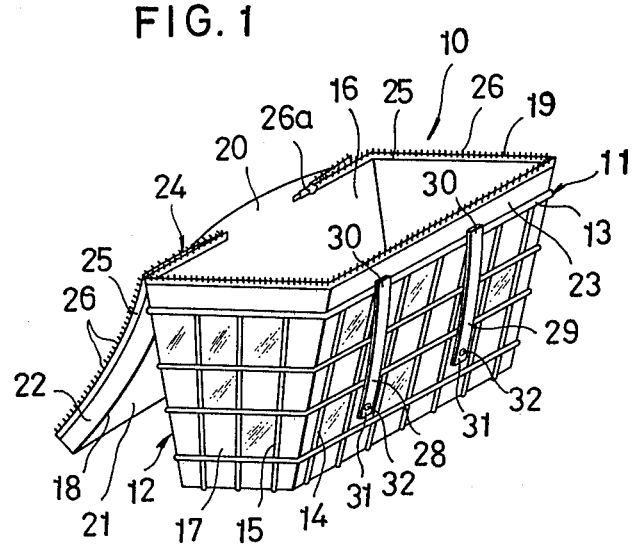
FIG. 1 is a perspective view of a combined basket and bag construction according to the invention, showing a bag in its open condition.

FIG. 1 shows a combined basket and bag construction 10 according to the invention which comprises a basket 11 in the form of an open latticework, and a bag 12 fitted internally of the basket 11, the basket and bag construction 10 being adaptable for use on a bicycle or a similar carriage.

The latticed basket 11 has a generally rectangular or trough-shaped configuration with an open top, and comprises a plurality of parallel spaced, horizontal wire elements 13 of a rectangular shape, a plurality of transverse wire elements 14 of U-shaped configuration disposed in parallel spaced, vertical relationship, and a plurality of longitudinal wire elements 15 of U-shaped configuration disposed in parallel spaced, vertical relationship, the horizontal wire elements 13, and vertical transverse and longitudinal wire elements 14 and 15 intersecting one another to provide an open-topped latticework as shown in FIG. 1.

The bag 12 is made of a flexible sheet material such as cloth, leather, artificial leather or a suitable synthetic resin, and includes a hollow body 16 having base and cover portions 17 and 18 split along the periphery of the bag body 16 to define a peripheral opening 19 therebetween, and an elongated connecting portion 20 extending along a minor portion of the periphery of the bag body 16 and connecting the base and cover portions 17 and 18 at their limited portions to interrupt the peripheral opening 19, the base portion 17 having an open top which is closed by the cover portion 18, and the cover portion 18 having a flat section 21 and a downwardly-directed peripheral flange 22. The connecting portion 20 serves as an axis of fold about which the cover portion 18 can be folded outwardly as shown in FIG. 1. The base portion 17 is complementary in shape to the interior of the basket 11 so as to be fitted in place internally thereof, thus serving as a liner for the basket 11, and the base portion 17 is of such a size that the upper peripheral margins 23 thereof project upwardly beyond the uppermost rectangular wire element 13 which defines the upper peripheral edge of the basket 11.

Figure 2:
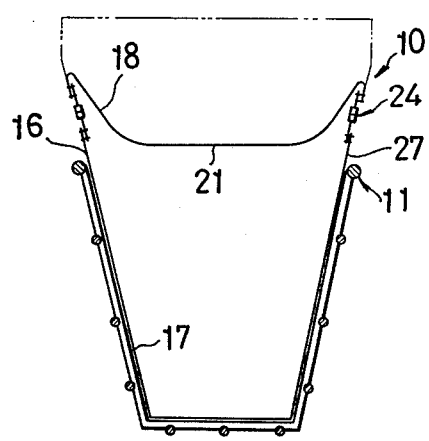
FIG. 2 is a transverse cross-sectional view through the combined basket and bag construction.
Figure 3:
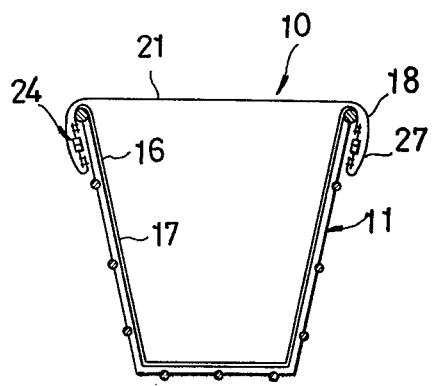

The bag 12 includes a sliding clasp fastener 24 having a pair of stringer tapes 25,25 carrying along their longitudinal edges rows of interengageable fastener elements 26 which are taken into and out of mutual engagement by a slider 26a movable along the rows of fastener elements 26 to close and open the sliding clasp fastener 24, the stringer tapes 25,25 being secured to the confronting marginal edges of the base and cover portions 17 and 18 defining the peripheral opening 19. As shown in the drawings, the sliding clasp fastener 24 is disposed upwardly of the basket 11 so as to facilitate manipulation of the slider 26a without interference therewith to close and open the sliding clasp fastener 24. Also, the sliding clasp fastener 24 is positioned slightly lower than a level centrally of the combined vertical dimensions of the peripheral margin 23 and the cover portion 18 which jointly constitute the upper portion 27 of the bag body 16. When the open top of the base portion 17 is closed by the cover portion 18 by closing the sliding clasp fastener 24, the cover portion 18 is normally deformed from upwardly-bulged or convex configuration indicated in dotted lines in FIG. 2 into a depressed or concave configuration indicated in a solid line in FIG. 2 due to its flexibility. With this arrangement, upon closure of the bag 12, the upper portion 27 can be folded outwardly upon the basket 11 along and over the outermost wire element 13 with the sliding clasp fastener 24 being covered and concealed from view by the cover portion 18 and with the flat section 21 kept tense as shown in FIG. 3.

The bag 12 is provided on either side thereof with a pair of parallel spaced, vertical straps 28,29 of identical make for removably attaching the bag 12 to the basket 11, each of the straps 28,29 having one end 30 fixedly secured to the peripheral margin 23 immediately above the uppermost wire element 13 and the other end 31 detachably secured to a lower portion of the side of the bag body 16 adjacent to the closed bottom thereof by a suitable fastening means 32 such as a hook and eye. The pair of straps 28,29 on one side of the bag body 16 are disposed respectively in registered relationship to another pair of straps (not shown) on the other side. As shown in FIG. 1, each of the straps 28,29 extends across and over the uppermost and two adjacent rectangular wire elements 13, and each straps has its lower or distal end 31 disposed intermediate the lowermost and penultimate rectangular wire elements 13.

When removed from the basket 11, the bag 12 is also adaptable for use as a general utility bag. The hooks and eyes 32 may be arranged such that the pair of the straps 28,29 on each side of the bag body 16 can be joined together at their lower or distal ends 31,31 to provide a one-piece handle extending in the longitudinal direction of the bag body 16. The lower or distal ends 31,31 of the pair of straps 28,29 on each side of the bag body 16 have a hook and an eye, respectively, and vice versa. Further, the arrangement of the hooks and eyes is such that each two registered straps 28,28 (29),(29) on the opposite sides of the bag body 16 can also be joined together at their lower or distal ends 31,31 to provide an alternative form of one-piece handle extending over and transversely of the bag body 16.

The sliding clasp fastener 24 of a standard type is provided at the opposite ends thereof with a pair of end stop members (not shown) for limiting closing and opening movements of the slider 26a along the fastener elements 26, the end stop members inseparably joining the stringer tapes 25,25 at their ends. Alternatively, and as illustrated in FIG. 4, the sliding clasp fastener 24 may be replaced by one of the separable type in which a pair of stringer tapes are completely separable from each other by means of what is commonly referred to as "a pin and box" 26b secured to one end of the sliding clasp fastener. The use of such a separable-type fastener enables the detachment of the cover portion 18 from the base portion 17, in which instance the peripheral opening 19 extends along the complete periphery of the bag body 16 to remove the connecting portion 20.

Since, when the bag 12 is closed, the upper portion 27 can be folded outwardly upon the basket 11 with the sliding clasp fastener 24 being covered and concealed from view by the cover portion 18, there is practically no possibility of the sliding clasp fastener 24 being subjected to damage resulting from contact with other objects. Such damage may result in intrusion of rain water into the bag when the basket and bag construction 10 is exposed to rain.

Advantageously, the sliding clasp fastener 24 attached to the upper portion 27 increases the rigidity thereof to facilitate the deformation of the upper portion 27 from its upwardly-bulged configuration (FIG. 2) to its depressed configuration (FIG. 3) and also to positively maintain the upper portion 27 in its depressed configuration.

Finally, since the upper portion 27 can assume the upwardly-bulged configuration, the bag 12 can have a maximum capacity if desired.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A combined basket and bag construction comprising:
   a. a basket of generally rectangular configuration having an open top and being in the form of a latticework consisting of spaced horizontal and vertical stake elements;
   b. a bag including a hollow body made of a flexible material and having base and cover portions split along the periphery of said bag body to define a peripheral opening therebetween, and an elongated connecting portion extending along a minor portion of the periphery of said bag body and connecting said base and cover portions at their limited portions to interrupt said peripheral opening, said bag body being fitted internally of said basket, said connecting portion serving as an axis of fold about which said cover portion can be folded outwardly, the upper portion of said bag projecting outwardly of said basket, and said peripheral opening being located in said upper portion;
   c. a sliding clasp fastener having a pair of stringer tapes carrying along their inner longitudinal edges rows of interengageable fastener elements, and a slider movable along said fastener elements to close and open said sliding clasp fastener, said stringer tapes being secured to the marginal edges along the complete length of said peripheral opening;
   d. means removably attaching said bag to said basket, said means comprising two pairs of vertical straps provided one pair on each side of said bag body, each of said straps having one end fixedly secured to said bag body and the outer end detachably secured to said bag body, and each of said straps extending across and over at least one of said horizontal stake elements, and;
   e. said upper portion being foldable outwardly upon said basket along and over the peripheral edge thereof with said sliding clasp fastener being covered and concealed from view by said upper portion.

2. A combined basket and bag construction according to claim 1, in which said detachable ends of each pair of straps being engageable with each other to provide a handle extending in the longitudinal direction of said bag body, and said detachable ends of each two corresponding straps on the opposite sides of said bag body also being engageable with each other to provide another handle extending over and in the transverse direction of said bag body.

* * * * *